US007942139B1

(12) United States Patent
Rockwell

(10) Patent No.: US 7,942,139 B1
(45) Date of Patent: May 17, 2011

(54) RING INSERT FOR AN AIR INTAKE CONDUIT FOR AN INTERNAL COMBUSTION ENGINE

(76) Inventor: Kirk J. Rockwell, Lakeview Terrace, CA (US)

( * ) Notice: Subject to any disclaimer, the term of this patent is extended or adjusted under 35 U.S.C. 154(b) by 1103 days.

(21) Appl. No.: 11/148,780

(22) Filed: Jun. 8, 2005

(51) Int. Cl.
*F02M 29/00* (2006.01)
*G01F 1/42* (2006.01)

(52) U.S. Cl. ...... 123/590; 123/188.7; 138/44; 48/189.4; 239/594

(58) Field of Classification Search .............. 239/88–92; 123/590, 188.7; 48/189.4; 138/44, 109
See application file for complete search history.

(56) References Cited

U.S. PATENT DOCUMENTS 1,061,655 A * 5/1913 Bachman ..................... 48/189.6
1,501,323 A * 7/1924 Edwards ..................... 48/189.4
1,585,139 A * 5/1926 Edwards ..................... 48/189.4
1,627,161 A * 5/1927 Edwards ..................... 48/189.4
1,776,741 A * 9/1930 Schwab ......................... 138/44
1,802,766 A * 4/1931 Kerr ................................ 138/44
1,867,876 A * 7/1932 Clark ............................ 406/153
1,895,047 A * 1/1933 Neumann .................. 137/484.8
2,017,043 A * 10/1935 Galliot ............................ 138/40
4,029,063 A * 6/1977 Tanaka et al. ............ 123/184.46
4,044,077 A * 8/1977 Gupta .......................... 261/23.2
4,088,104 A * 5/1978 Ibbott .......................... 48/189.4
4,130,099 A * 12/1978 Ferguson ...................... 123/590
4,345,574 A * 8/1982 Iwami ........................... 123/587
4,409,951 A * 10/1983 Whitworth .................... 123/590
4,474,163 A * 10/1984 Linder et al. ................. 123/590
4,754,927 A * 7/1988 Fitzgerald ................ 239/265.17
4,991,561 A * 2/1991 Gerassimov et al. ......... 123/527
5,097,814 A * 3/1992 Smith ........................... 123/590
5,287,828 A * 2/1994 Kennedy ....................... 123/590
5,551,838 A * 9/1996 Hugbart ........................ 415/206
6,606,975 B1 * 8/2003 Caliskan et al. .............. 123/306
6,810,863 B2 * 11/2004 Memmott et al. ............ 123/527
7,086,417 B2 * 8/2006 De Almeida .................... 138/44
7,412,974 B2 * 8/2008 Russell ......................... 123/590
2002/0185117 A1 * 12/2002 Algeri ........................... 123/590

* cited by examiner

*Primary Examiner* — Dinh Q Nguyen
*Assistant Examiner* — James S Hogan
(74) *Attorney, Agent, or Firm* — Sandy Lipkin

(57) ABSTRACT

A ring insert for an air intake conduit for an internal combustion engine comprising a sleeve-shaped body which is tightly mounted within the air intake conduit. The body has an inner surface which includes an annular surface in the shape of a truncated cone defining an annular inclined surface that is narrower at the forward edge of the body than at the rearward edge forming a venturi directly adjacent the rearward edge. The forward edge of the body is smoothly contoured and the rearward edge of the body is smoothly contoured.

16 Claims, 4 Drawing Sheets

RING INSERT FOR AN AIR INTAKE CONDUIT FOR AN INTERNAL COMBUSTION ENGINE

BACKGROUND OF THE INVENTION

1. Field of the Invention

The present invention relates generally to inserts for intake conduits for an internal combustion engine for the purpose of increasing oxygen flow into the combustion chambers of the engine to increase power thereby achieving greater torque and horsepower, increase gas mileage and have the engine run leaner to decrease smog and burn less fuel.

2. Description of the Related Art

Every internal combustion engine intakes air with the oxygen in the air being used to achieve burning of the fuel within the combustion chambers of the engine. If there is supplied more than an adequate amount of air, there is supplied a more than adequate amount of oxygen to achieve the leanest possible combustion of the fuel within the combustion chambers. The more oxygen that is supplied within the combustion chambers the more complete ignition of the fuel is achieved within the combustion chamber. The more complete the burning of the fuel, the greater the torque and horsepower that is achieved from the engine. Also, the more complete burning of the fuel minimizes exhaust emissions from the engine. The more complete burning of the fuel, the better the fuel economy. It is common to insert a butterfly-type of vane valve to throttle the air that is being supplied to the internal combustion engine. This vane valve is controlled in conjunction with the operating of the engine to control the amount of air that is being supplied into the engine. The valve is more open at higher engine speeds. A smaller volume of air is required during engine idling than during normal engine operation and therefore the vane valve is positioned partially closed.

It has been found that as the engine operates and air is sucked in through the air inlet into the combustion chambers that this air is churning creating a turbulent air intake condition. It has been discovered that turbulent air entering in a fuel injection chamber of an internal combustion engine is not the most desirable scenario. Laminar flow of the air is preferred. It has been discovered in the past that if a venturi was inserted within the air intake of an internal combustion engine that the turbulence of the air is decreased and the airflow tends to become more laminar.

It has been known to design venturies in conjunction with air intake conduits of internal combustion engines. These venturies achieve more complete burning of the fuel, but in the past these venturies have not maximized the fuel burning to achieve maximum efficiency in the combustion of the fuel within the engine. Additionally, these venturies required substantial modification of the air throttle passage or inlet conduit and therefore unless such venturies are incorporated at the time of manufacturing the internal combustion engine, widespread usage of such venturies in conjunction with air inlet conduits has not been achieved. On diesel engines, the insert position is at the air intake tube or right before the air sensor and the intake tube. The air intake tube is positioned after the turbocharger and the inner cooler. In gas powered engines, the intake is at the throttle body before the butterfly.

It would be desirable to design a venturi insert that could be easily inserted within a conventional air intake conduit of an internal combustion engine that will cause the air to be conducted through a venturi prior to flowing within the combustion chambers of the internal combustion engine.

SUMMARY OF THE INVENTION

A first basic embodiment of the present invention is directed to a ring insert for an air intake conduit of an internal combustion engine that utilizes a body which has an outer surface and an inner surface. A portion of the outer surface is to be inserted within an air intake conduit of an internal combustion engine. The body has a forward edge and a rearward edge with both the forward edge and the rearward edge being smoothly contoured. The inner surface of the body includes an annular surface in the shape of a truncated code defining an annular inclined surface that is narrower at the forward edge than at the rearward edge forming a venturi, whereby as air is forced through the body the air is compressed increasing the velocity of the air and decreasing the pressure of the air with the airflow becoming laminar causing increased oxygen to be delivered into the combustion chamber of the engine.

A further embodiment of the present invention is where the first basic embodiment is modified by defining that there is a sealing means located between the outer surface of the body and the air intake conduit.

A further embodiment of the present invention is where the just previous embodiment is modified by defining that the sealing means constitutes an O-ring.

A further embodiment of the present invention is where the basic embodiment is modified by defining that the forward edge of the body is formed into a radius of approximately 0.125 inches.

A further embodiment of the present invention is where the first basic embodiment is modified by defining that the rearward edge of the body is formed into a radius of approximately 0.25 inches.

A further embodiment of the present invention is where the first basic embodiment is modified by defining that the angle of the inclined surface being within the range of fifteen to twenty-five degrees relative to the direction of airflow through the body.

A further embodiment of the present invention is where the first basic embodiment is modified by defining that the diameter of the venturi is approximately three-fourths of the diameter of the portion of the outer surface that is inserted within the air intake conduit.

A further embodiment of the present invention is where the first basic embodiment is modified by defining that relative to the length of the body, which is defined as Y, the venturi starts at about four-fifths Y relative to the forward edge of the body.

A second basic embodiment of the present invention is directed to a venturi device for an air intake conduit for an internal combustion engine which comprises a body having a through opening with the body having a forward edge and a rearward edge. Air flows through the through opening from the forward edge to the rearward edge. The through opening has a wall surface. This wall surface includes an annular surface in the shape of a truncated cone defining an annular inclined surface that is narrower at said forward edge than at said rearward edge forming a venturi directly adjacent the rearward edge.

A further embodiment of the present invention is where the second basic embodiment is modified by defining that the annular inclined surface is located at a fifteen to twenty-five degree angle to the direction of flow of air through the through opening.

A further embodiment of the present invention is where the second basic embodiment is modified by defining that the diameter of the venturi being approximately three-fourths of the diameter of the diameter of the body.

A further embodiment of the present invention is where the second basic embodiment is modified by defining that the length of the body is Y and the distance from the forward edge to the venturi is approximately four-fifths Y.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
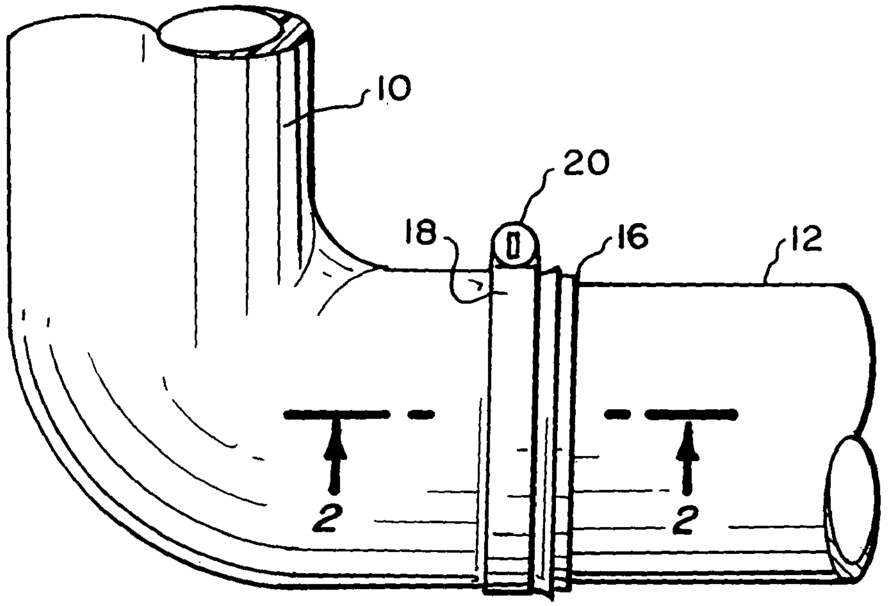
FIG. 1 shows an external view of an air intake conduit for an internal combustion engine within which the ring insert of the present invention has been installed.

Referring particularly to the drawings, there is shown in FIG. 1 an air intake hose 10 of an air throttle system of an internal combustion engine. Generally, the hose 10 will be constructed of a rubber or plastic composition. The air throttle system includes an air intake conduit 12 which will be constructed of a metallic material, usually aluminum or steel. The air intake conduit 12 includes a connection area 14 located directly adjacent the entrance into the conduit 12. The connection area 14 is terminated at its inner end by an annular shoulder 16. A clamping band 18, which can be tightened and loosened by turning of screw 20, is mounted about the hose 10 and functions to tightly clamp the hose 10 onto the connection area 14 of the air intake conduit 12 with the hose 10 abutting against shoulder 16. The ring insert 22 of this invention is designed to be located within both the internal passage 24 of the air intake conduit 12 and also within the internal passage 26 of the air intake hose 10. This mounting of the ring insert 22 is clearly shown in FIG. 2 of the drawings.

Figure 2:
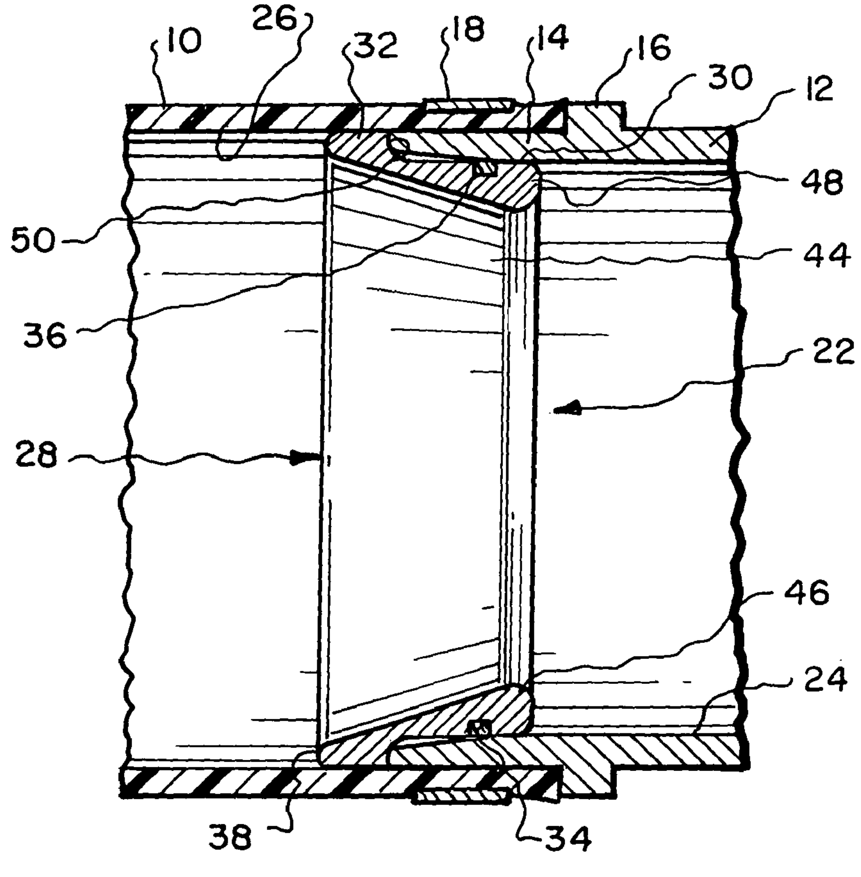
FIG. 2 is a longitudinal cross-sectional view taken along line 2-2 of FIG. 1.

The ring insert 22 comprises a body 28 which is basically in the form of a sleeve. The body 28 has a necked down outer surface 30 which is of a smaller diameter than the front portion 32 of the outer surface 30. When installed in position, as shown in FIG. 2, the front portion 32 abuts against the internal passage 26 with the necked down outer surface 30 abutting against the internal passage 24.

An annular groove 34 is formed within the necked down outer surface 30. Mounted within the annular groove 34 is an O-ring 36. Although the use of the O-ring 36 is deemed to be most desirable, it is considered to be within the scope of this invention that other type of sealing devices could be utilized. When the necked down outer portion 30 is manually inserted within the internal passage 24, the O-ring 36 will form am airtight connection between the ring insert 22 and the air intake conduit 12 insuring that the ring insert 22 is held in place during continual operation of the engine with which it is associated over an extended period of time. The use of the O-ring 36 also facilitates ease of installation only requiring that the clamping band 18 be loosened and the hose 10 disengaged from the air intake conduit 12 with the ring insert 22 to then be inserted in conjunction with the air intake conduit 12 and then hose 10 reinstalled in position and the clamping band 18 tightened compressing the hose 10 against the connection area 14.

Figure 4:
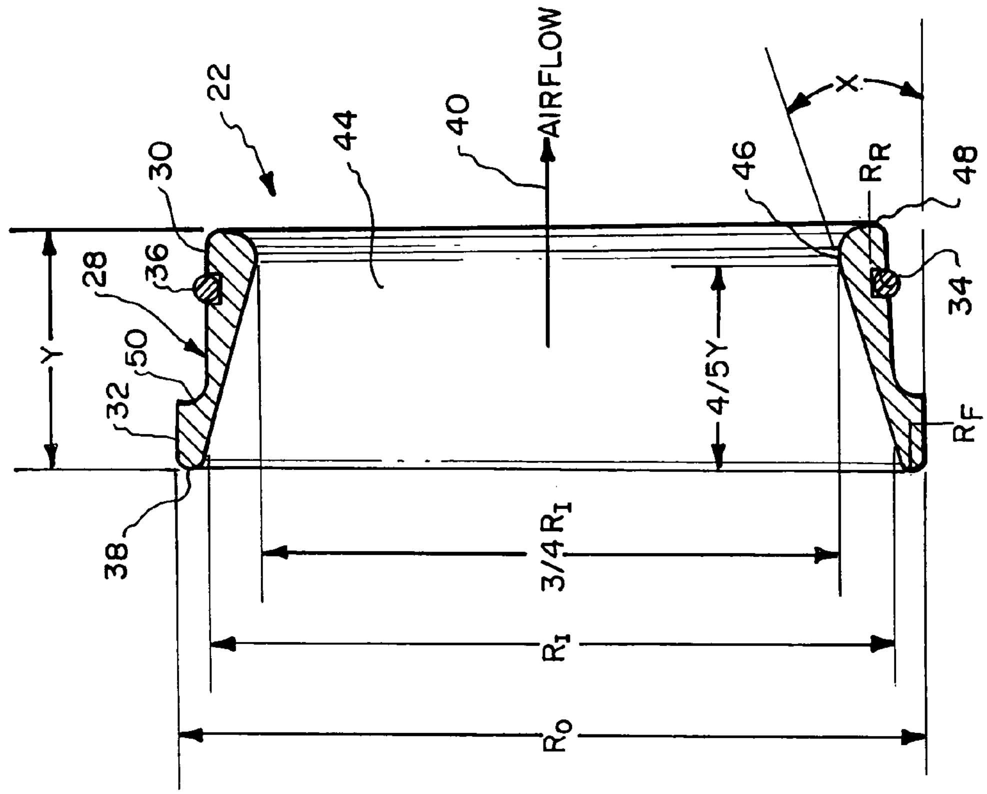
FIG. 4 is a cross-sectional view through the ring insert taken through line 4-4 of FIG. 3.
Figure 3:
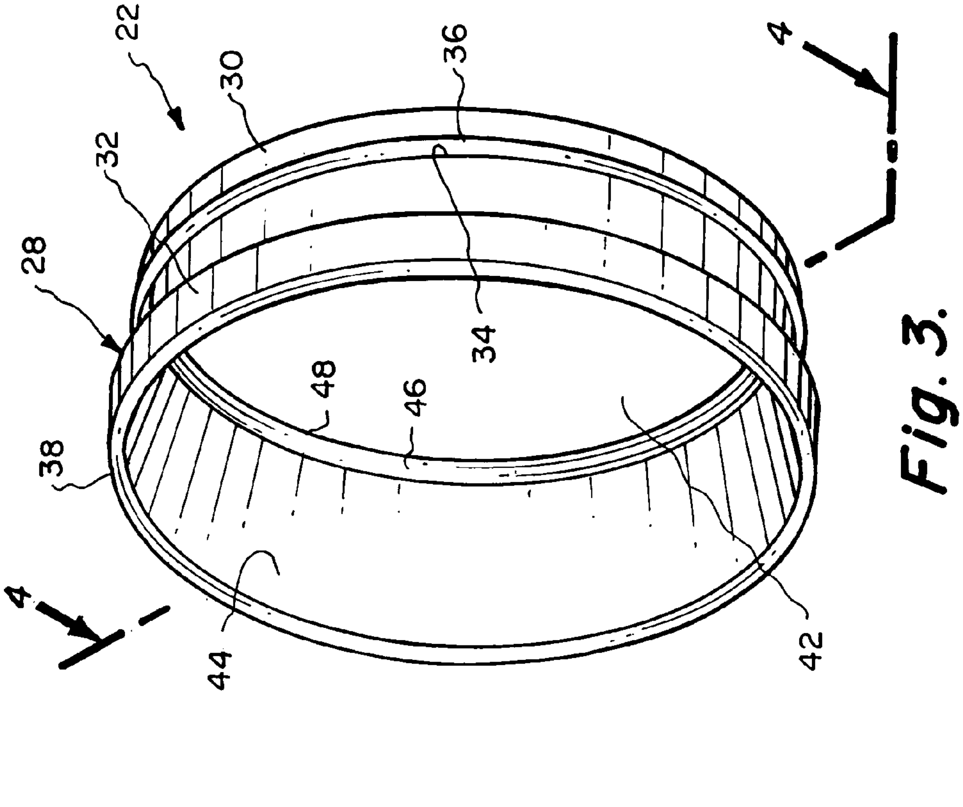
FIG. 3 is an isometric view of the ring insert of the present invention with the isometric view being taken from the forward direction of the ring insert.

The body 28 includes a smoothly contoured forward edge 38. It has been found that if the forward edge 38 is not sharp but is roundly contoured having a radius of about 0.125 inches that the air that flows in direction of arrow 40 through the through opening 42 of the body 28 of the ring insert 22, that minimum disruption of the airflow is achieved tending to minimize turbulence of the airflow. From the forward edge 38 the wall surface of the through opening 42 is inclined within the range of fifteen to twenty-five degrees relative to the direction 40 of the airflow. This angle is shown as angle X in FIG. 4. The radius of curvature of the forward edge 36 is shown as $R_f$, also in FIG. 4. This inclined surface 44 is in the shape of a truncated cone and terminates at a venturi 46 near the rearward edge 48 of the body 28. The maximum exterior diameter of the ring insert 22 is shown in FIG. 4 as $R_o$. The diameter $R_o$ is slightly greater than the diameter $R_i$ of the necked down outer surface 30. It has been found to be preferable that the transition area between the front portion 32 and the necked down outer surface 30 is best when this transition area 50 has a radius of approximately five sixteenths of an inch. The diameter at the venturi 46 is best when it equals about three-fourths $R_1$. However, it is considered to be within the scope of this invention that the diameter of the venturi 46 could be somewhat decreased or could be slightly expanded. As the air flows through the through opening 42, the air becomes compressed and non-turbulent (laminar). After the air passes the venturi 46, it quickly expands and functions as a suction to drag in more air so that the maximum amount of air is supplied into the combustion chambers of the internal combustion engine. The location of the beginning edge of the venturi is preferably about four-fifths Y with Y being defined as the length of the body 28. The preferable radius of curvature $R_r$ for the venturi 46 is about approximately 0.25 inches. However, it is to be understood that that radius of curvature can slightly increase or decrease without departing from the scope of this invention.

Figure 5:
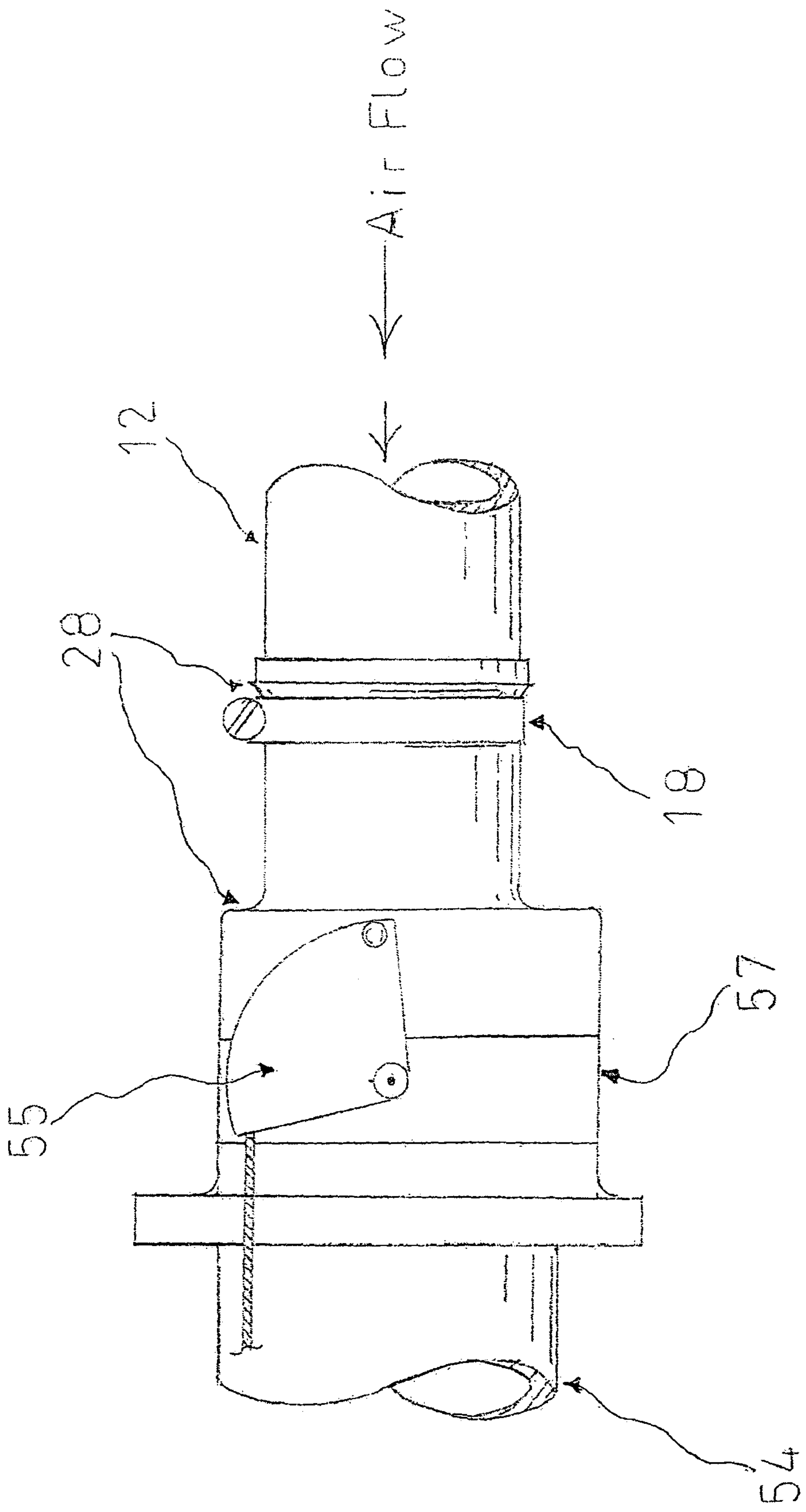
FIG. 5 is a side view of the device when used in conjunction with a throttle body.

FIG. 5 shows the position of the device 28 of the instant invention in a throttle body 57. Air intake conduit 12 receives the flow of air. The air intake conduit 12 is attached to the throttle body 57 through the use of the device of the instant invention 28 which, as illustrated, is held in place with a clamping band 18. On the distal end of the throttle body 57 is found the throttle body butterfly valve 55 and the plenum 54.

Figure 6:
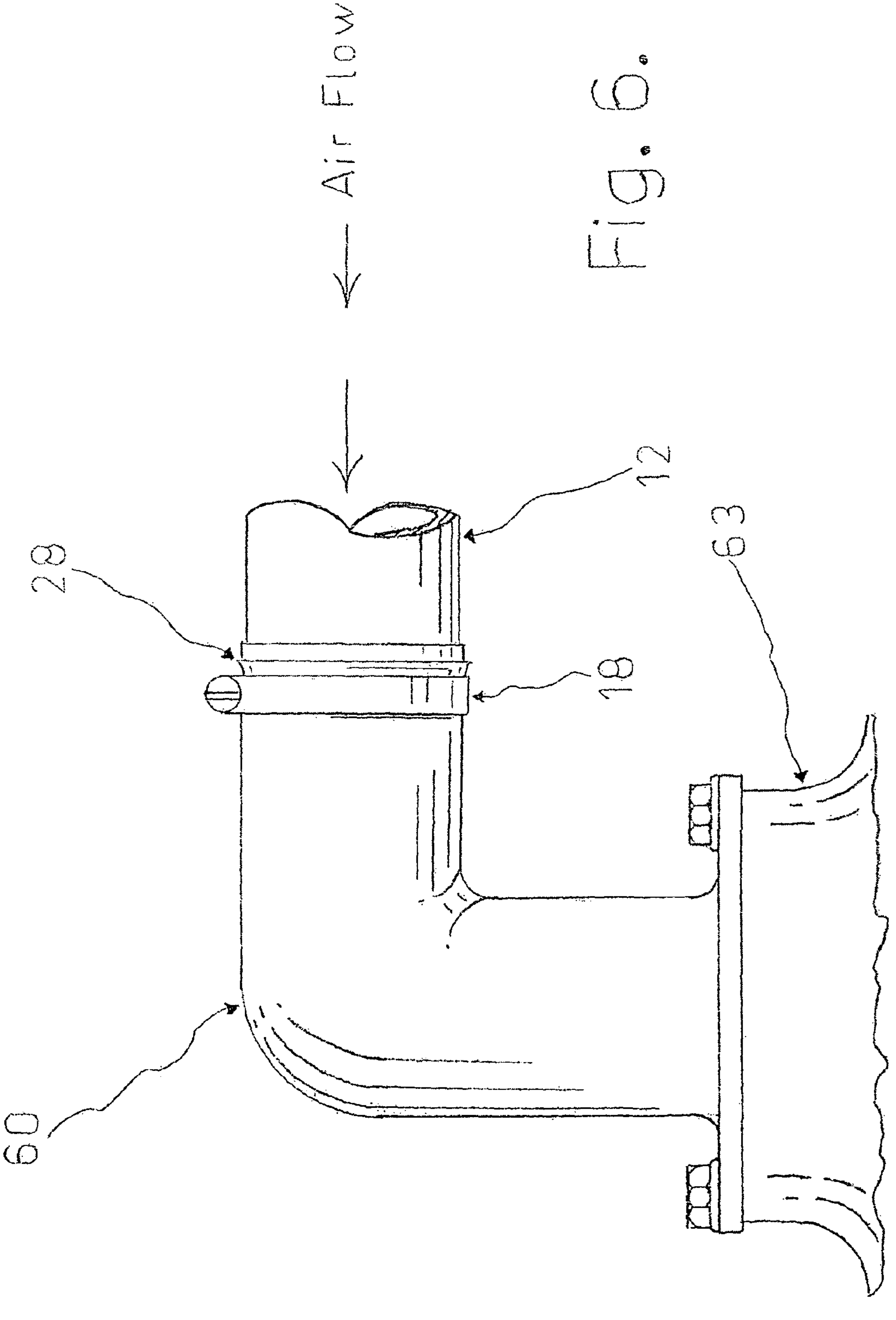
FIG. 6 is a side view of the device when used in conjunction with an elbow intake for diesel applications.

FIG. 6 is analogous the view shown in the FIG. 5, with the device 28 being positioned to connect an air intake conduit 12 to an elbow intake conduit 60 which is attached to the engine block 63. The device 28 is held in place with a clamping band 18.

Basically, the ring insert 22 is a precision machine in the form of a micropolished, aluminum insert that fits in a throttle body which comprises the air intake conduit 12. The ring insert 22 dramatically improves airflow for better performance, throttle response and fuel mileage. Not only is the air increased in speed as it is conducted through the ring insert 22 but it also drops in pressure. This faster moving low pressure air contains more oxygen. It flows faster into the intake manifold and delivers the oxygen to the combustion chambers. More energy is released by the engine by leaning out the mixture for more torque, horsepower and better mileage. The ring insert 22 of this invention installs in minutes, increases the power when the operator of the engine pushes on the accelerator of the engine and achieving a quicker more powerful response. Better increased mileage, generally about three plus miles per gallon is achieved. The ring insert 22 can be designed to fit all port fuel injection engines.

It is considered to be within the scope of this invention that the venturi could be manufactured integral with the air intake conduit not comprising a separate insert.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A ring insert that provides for an increase in air flow leading to a correlating increase in fuel efficiency for an internal combustion engine that is placed into a throttle body before a butterfly in a gas powered engine or at an intake tube or right before said intake tube in a diesel engine comprising:

a body having an outer surface and an inner surface, a portion of said outer surface adapted to be inserted within an air intake conduit, said body having a forward edge and a rearward edge, said forward edge being roundly contoured at an angle between 45 and 90 degrees; and said inner surface including an annular surface in the shape of a truncated cone defining an annular inclined surface that is narrower at said forward edge than at said rearward edge forming a venturi directly adjacent said rearward edge said inner surface having a completely smooth and ungrooved surface thereby providing for laminar flow and reducing turbulence so that as air is forced through said body from said forward edge to said rearward edge the air is compressed increasing the velocity of the air and decreasing the pressure of the air, said air compression and decrease in pressure being caused by the vacuum created by said roundly contoured forward edge.

2. The ring insert as defined in claim 1 wherein: sealing means mounted on said portion of said outer surface, said sealing means to form an airtight connection with the air intake conduit.

3. The ring insert as defined in claim 2 wherein: said sealing means comprising an O-ring.

4. The ring insert as defined in claim 1 wherein: said forward edge having a radius of approximately 0.125 inches.

5. The ring insert as defined in claim 1 wherein: said rearward edge having a radius of about 0.25 inches.

6. The ring insert as defined in claim 1 wherein: said annular inclined surface being located at fifteen to twenty-five degree angle to the direction of flow of the air through said body.

7. The ring insert as defined in claim 1 wherein: the diameter of said venturi being approximately three-fourths of the diameter of said portion of said outer surface.

8. The ring insert as defined in claim 1 wherein: the length of said body being defined as Y, the distance from said forward edge to said venturi being approximately four-fifths Y.

9. A method of increasing oxygen flow only into the combustion chamber of an engine comprising the steps of:

locating an intake conduit on said engine;

locating a hose connected to said conduit through a securing means;

removing said securing means;

inserting into said intake conduit a ring insert that provides for an increase in air flow leading to a correlating increase in fuel efficiency for an internal combustion engine that is placed into a throttle body before a butterfly in a gas powered engine or at an intake tube or right before said intake tube in a diesel engine, said ring insert further comprising:

a body having an outer surface and an inner surface, a portion of said outer surface adapted to be inserted within an air intake conduit, said body having a forward edge and a rearward edge, said forward edge being roundly contoured at an angle between 45 and 90 degrees; and said inner surface including an annular surface in the shape of a truncated cone defining an annular inclined surface that is narrower at said forward edge than at said rearward edge forming a venturi directly adjacent said rearward edge said inner surface having a completely smooth and ungrooved surface thereby providing for laminar flow and reducing turbulence so that as air is forced through said body from said forward edge to said rearward edge the air is compressed increasing the velocity of the air and decreasing the pressure of the air, said air compression and decrease in pressure being caused by the vacuum created by said roundly contoured forward edge.

10. The method as defined in claim 9 wherein: sealing means mounted on said portion of said outer surface, said sealing means to form an airtight connection with the air intake conduit.

11. The method as defined in claim 10 wherein: said sealing means comprising an O-ring.

12. The method as defined in claim 9 wherein: said forward edge having a radius of approximately 0.125 inches.

13. The method as defined in claim 9 wherein: said rearward edge having a radius of about 0.25 inches.

14. The method as defined in claim 9 wherein: said annular inclined surface being located at fifteen to twenty-five degree angle to the direction of flow of the air through said body.

15. The method as defined in claim 9 wherein: the diameter of said venturi being approximately three-fourths of the diameter of said portion of said outer surface.

16. The method as defined in claim 9 wherein: the length of said body being defined as Y, the distance from said forward edge to said venturi being approximately four-fifths Y.

* * * * *

UNITED STATES PATENT AND TRADEMARK OFFICE

CERTIFICATE OF CORRECTION

PATENT NO. : 7,942,139 B1
APPLICATION NO. : 11/148780
DATED : May 17, 2011
INVENTOR(S) : Rockwell It is certified that error appears in the above-identified patent and that said Letters Patent is hereby corrected as shown below:

The correction required is to claim 1 and claim 9. In claim 1, column 5, line 56, “from said forward edge to said rearward edge” should read “from said rearward edge to said forward edge.” Additionally, in claim 9, column 6, line 41, “from said forward edge to said rearward edge” should read “from said rearward edge to said forward edge.”

Column 2, line 49, “forward edge to the rearward edge” should read “rearward edge to the forward edge.”

Signed and Sealed this
Twenty-sixth Day of July, 2011

David J. Kappos
*Director of the United States Patent and Trademark Office*

UNITED STATES PATENT AND TRADEMARK OFFICE

CERTIFICATE OF CORRECTION

PATENT NO. : 7,942,139 B1
APPLICATION NO. : 11/148780
DATED : May 17, 2011
INVENTOR(S) : Rockwell It is certified that error appears in the above-identified patent and that said Letters Patent is hereby corrected as shown below:

On the title page, insert item (73) to read:

--Mile Edge Plus, Inc., 2659 Townsgate Rd., Suite 202, Westlake Village, CA 91361--

Signed and Sealed this
Fifteenth Day of May, 2012

David J. Kappos

*Director of the United States Patent and Trademark Office*